Jan. 1, 1963 W. S. MILLER 3,071,021
MECHANICAL POWER AMPLIFIER
Filed May 16, 1960
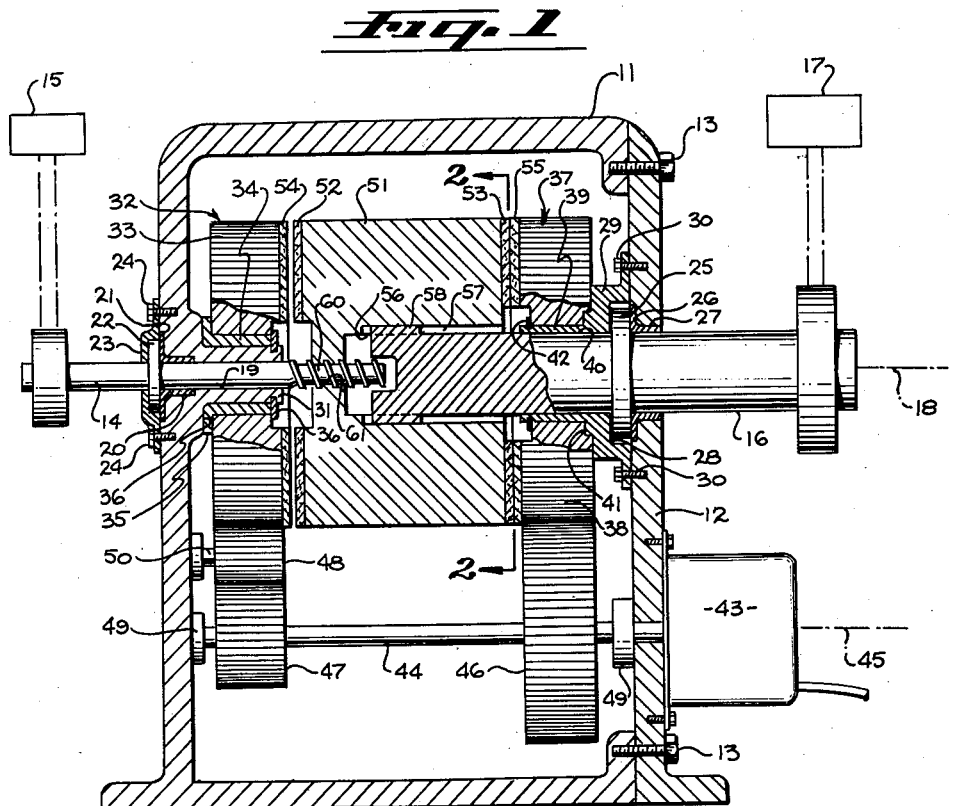
Fig. 1
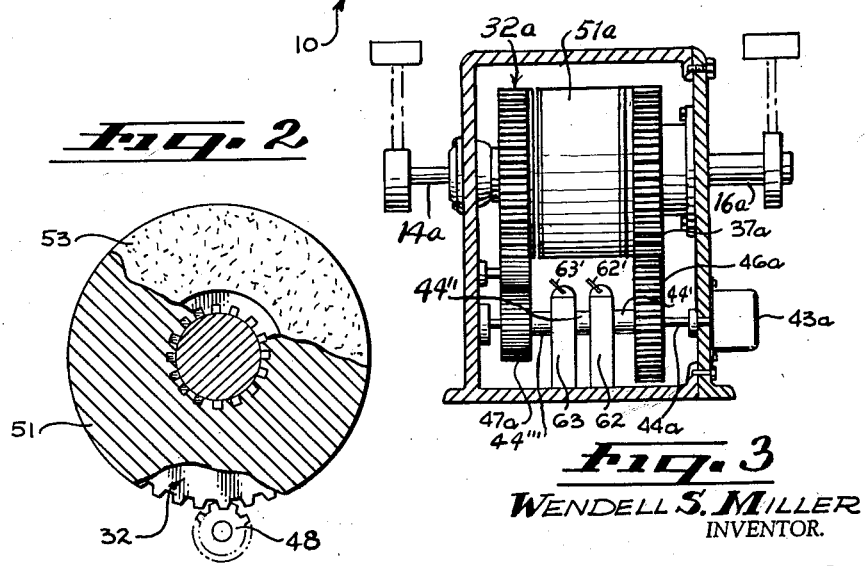
Fig. 2
Fig. 3
WENDELL S. MILLER
INVENTOR.
BY William P. Green
ATTORNEY

United States Patent Office 3,071,021
Patented Jan. 1, 1963

3,071,021
MECHANICAL POWER AMPLIFIER
Wendell S. Miller, 1341 Comstock Ave.,
Los Angeles, Calif.
Filed May 16, 1960, Ser. No. 29,324
16 Claims. (Cl. 74—377)

This invention relates to improved mechanical power amplifiers, for producing a relatively large output force in response to the imposition of a much smaller input force into the apparatus.

A device constructed in accordance with the invention includes a control input shaft which is adapted to be turned manually or by suitable control means to any desired rotary position and at any desired rate. The device also includes an output shaft which follows substantially exactly the rotary movements of the control input shaft. The output shaft is power driven as it follows the input shaft, to thus provide an output torque which is much greater than that supplied at the input side of the apparatus.

Though certain types of mechanical power amplifiers have been devised in the past for accomplishing the above general purpose, these prior devices have had several very decided disadvantages in use. In the first place, the prior mechanical amplifiers with which I am acquainted have been relatively complex in construction, and therefore more expensive to manufacture than would be desired. Further, they have normally contained power transmitting parts or mechanism which have been inherently very weak in construction, and consequently incapable of supplying output forces of as great a magnitude as are necessary in many situations. As a result, these prior mechanical amplifiers have seen only very limited use.

With the above in mind, a major object of the present invention is to provide a new type of power amplifier which is structurally much simpler than previously devised equipment for the same purpose, and which in addition is so constructed as to be capable of producing output torques which are much greater than the torques supplied by previously devised equipment of this general character. More particularly, a unit embodying the invention includes two rotary elements which are power driven at different angular velocities by a suitable electric motor or the like, and which are adapted to be clutched in either of two different conditions of the apparatus to a third rotary element positioned between the first two. Relative axial movement between the third rotary element and the other two elements brings the third element selectively into driven relation or engagement with either of the first two drive members, to thus be turned selectively at either of the two different angular velocities with those elements. Preferably, the third or central element has clutch faces at its opposite axial sides which are engageable selectively with opposed clutch faces on the first and second rotary elements respectively. At this point it might be noted that the phrase "different angular velocities" is used herein in a technical sense, to refer either to a situation in which the two elements are driven at different speeds in a common rotary direction, or at any relative speeds in opposite directions.

Relative axial shifting movement of the different rotary elements is controlled by rotation of the control input shaft relative to the output shaft. Such relative rotation of the control input shaft shifts the three rotary clutch elements to positions for transmitting to the third element and the output shaft forces from the motor for driving the output shaft in a direction to follow the control input shaft. This shifting actuation of the rotary elements to different drive positions is preferably effected by means of a screw thread connection between the control input shaft and one or more of the rotary clutch elements. For best operation, this screw thread connection is a connection between the control input shaft and the third or central one of the three rotary elements, so that rotation of the input shaft relative to the third element (which is keyed to the output shaft) will shift the third element in a direction causing the output shaft to follow the input shaft.

The above and other features and objects of the present invention will be better understood from the following detailed description of the typical embodiment illustrated in the accompanying drawing in which:

FIG. 1 is a vertical section through a mechanical power amplifier constructed in accordance with the invention;

FIG. 2 is a fragmentary section taken on line 2—2 of FIG. 1; and

FIG. 3 is a fragmentary representation of a variational form of the invention.

The mechanical power amplifier illustrated in FIGS. 1 and 2 includes a hollow rigid housing or body structure 10, typically formed of a main section 11 and a removable end cover 12 secured on the main section by bolts or screws 13. The control input shaft of the device is shown at 14, and may be turned either manually or by any desired control unit represented at 15. The output shaft is shown at 16, and typically acts to drive a controlled unit diagrammatically designated at 17. The two shafts 14 and 16 are axially aligned, both being mounted for rotation about a main axis designated at 18. To mount the control input shaft 14 for such rotation, this shaft extends through a passageway 19 formed in housing 10, with an annular flanged bushing 20 being received within that passageway to effectively journal the control input shaft. Bushing 20 has an annular flange 21 against which an annular radially outwardly projecting flange 22 formed on the control input shaft 14 abuts, to prevent axially inward movement of the input shaft. Axially outward movement of shaft 14 is prevented by an annular thrust bearing element 23, which abuts against the opposite side of shaft flange 22, and which is peripherally secured in fixed relation to housing 10 by screws or bolts 24. Thus, the input shaft is mounted for rotation about axis 18 but is effectively retained against axial movement by means of the thrust bearing structure 21—22—23.

Similarly, the output shaft 16 is retained against axial movement by means of a thrust bearing assembly including a radially outwardly projecting annular flange 25 formed on shaft 16 and abutting at its opposite sides against flange 26 of a bushing 27 and surface 28 of a bushing element 29 which is secured to housing cover 12 by screws 30.

Inwardly beyond bushing 20, the main section 11 of housing 10 forms a tubular boss or projeciton 31, about which there is rotatably mounted a circular gear 32 having external teeth 33. A bushing 34 mounts gear 32 for such rotation, and has a radially projecting flange 35 which abuts at one side against a shoulder 36 on the housing, and at the other side against gear 32, to prevent axial movement of the gear to the left as seen in FIG. 1. As will be apparent, the rotary axis of gear 32 is the same axis 18 about which the two shafts 14 and 16 turn. The gear may be retained against axial movement to the right (as viewed in FIG. 1) in any suitable manner, as by a snapring 36 received within a groove in boss 31, and engaging a transverse shoulder formed at the right side of gear 32.

Near the output side of the apparatus there is provided a second rotary gear 37, having external teeth 38, and which may be very similar to the first discussed gear 32. Gear 37 is rotatably mounted about a cylindrical projection 39 formed on the bushing or bearing element 29. This projection 39 is internally cylindrical, and extends about and assists in journalling an externally cylindrical portion 40 of output shaft 16. Gear 37 is retained against rightward movement by its abutting engagement at 41 against element 29, and is retained against leftward movement by means of a snap ring 42 received within a groove in projection 39 of part 29.

The two gears 32 and 37 are continuously rotatably driven in opposite rotary directions by means of an electric motor 43, which may typically be mounted to the outside of the housing, as shown. Motor 43 drives a power supply shaft 44, which turns about an axis 45 extending parallel to but offset from main axis 18 of the apparatus. Shaft 44 rigidly carries two spaced gears 46 and 47, the former of which is relatively large and directly drives gear 37, while the second gear 47 is smaller and drives gear 32 through an intermediate idler gear 48. As will be apparent, this intermediate idler acts to reverse the direction of rotation of gear 32 relative to the directly driven gear 37. Suitable housing mounted bearings may be provided at 49 for journalling shaft 44, and a short stub shaft 50 attached to the housing may be provided for rotatably mounting idler 48.

Axially between the two gears 32 and 37, there is provided an annular rigid member 51 mounted for rotation about the main axis 18, and free also for limited axial movement relative to the two gears 32 and 37. At its opposite axial sides, member 51 carries two annular clutch faces 52 and 53, formed of high friction braking or clutching material tightly bonded or otherwise secured in fixed relation to member 51. Opposite these two clutch faces 52 and 53, the gears 32 and 37 carry a second pair of similar clutch discs 54 and 55, bonded or otherwise secured in fixed relation to the carrying parts 32 and 37 respectively, and also formed of a high friction braking or clutching material. Member 51 and its carried faces 52 and 53 are movable axially between the FIG. 1 position in which discs 53 and 55 are in clutching engagement to transmit rotation from gear 37 to member 51, and a second position in which discs 52 and 54 are in abutting clutching engagement to transmit rotation in the opposite rotary direction from gear 32 to member 51. For transmitting rotation in either of these directions from member 51 to output shaft 16, the member 51 has an inner recess 56 into which the output shaft projects, and having inner splines 57 engageable with corresponding axially extending splines 58 on the output shaft to transmit rotation from member 51 to element 16 while allowing axial movement of part 51 relative to shaft 16. This spline connection 57—58 between parts 16 and 51 also functions to mount member 51 through shaft 16 for its desired rotary movement about axis 18.

For effecting automatic shifting movement of the member 51 between its two extreme driving positions, through an intermediate neutral position in which neither of the sets of clutch discs are in driving engagement, there is provided a control connection between shaft 14 and member 51. This control connection takes the form of a screw thread connection between these parts, at which an externally threaded end portion 60 of shaft 14 engages internal threads 61 formed within member 51. The threads 60 and 61 may have a relatively great pitch, to displace member 51 axially relatively rapidly for a very limited turning movement of shaft 14 relative to part 51.

To now describe the manner of operation of the apparatus, assume first that the device is assembled as shown, and that electric motor 43 is energized to continuously drive shaft 44, and thereby to continuously drive gears 32 and 37 in opposite rotary directions. In the illustrated arrangement, it may be assumed that gear 32 is turning in a clockwise direction as viewed from the left side of FIG. 1, while gear 37 turns in a counterclockwise direction as viewed from the same side of the apparatus.

If an operator or the control unit 15 now turns control input shaft 14 in a clockwise direction (as viewed from the left of FIG. 1), the screw thread connection 60—61 between parts 14 and 51 acts to shift member 51 to the left, to bring clutch discs or faces 52 and 54 into frictionally driving engagement, so that gear 32 commences to turn member 51. Such rotary movement of member 51 acts through spline connection 57—58 to correspondingly turn the output shaft 16 and the controlled apparatus 17. Thus, the output shaft 16 is turned by motor 43 in the same direction as that in which shaft 14 has been turned by the much smaller force of control member 15 or manual force of an operator.

If the rotation of the control input shaft 14 is now halted, the continued rotation of gear 32 will turn member 51 relative to shaft 14, and the screw threaded connection 60—61 will act to shift member 51 to the right as a result of this relative rotation. This moves clutch face 52 out of driven engagement with clutch disc 54, so that member 51 and the output shaft 16 are no longer power rotated. The output shaft will then stop in a position in which it has turned substantially exactly the same distance as control input shaft 14. If a counterclockwise rotation is imparted to control input shaft 14, the screw thread connection 60—61 moves member 51 to the right as viewed in FIG. 1, so that gear 37 drives member 51 and the output shaft in a counterclockwise direction (as viewed from the left of FIG. 1), to follow the movement of the control input shaft in that opposite direction. Consequently, the output shaft 16 will follow the control input shaft exactly in either direction. If the rate of rotation of the control input shaft is different than the rate of rotation of gears 32 and 37, then the screw thread connection 60—61 acts inherently to automatically adjust member 51 to attain an output shaft speed which is the same as the input shaft speed. This is attained either by rapidly shifting member 51 between a driving position and neutral position, or more often by automatically adjusting the axial force applied at clutch faces 52 and 54, or 53 and 55, to allow just sufficient slippage for attaining the proper output speed.

FIG. 3 shows a variational form of the invention which may be the same as that of FIGS. 1 and 2 except as to the drive gear arrangement. In FIG. 3, motor 43a drives shaft 44a, gear 46a (which is fixed to shaft 44a) and gear 37a in the same manner as in FIG. 1. However, the clutching gear 32a is driven somewhat differently, specifically through a reversing gear unit represented at 62, a speed regulating control or transmission 63, and a gear 47a, all suitably mounted in housing 10a. Unit 62 may normally be maintained in a condition to transmit power from shaft 44a to gear 47a without a reversal in direction of rotation, so that the two gears 32a and 37a turn in a common direction, rather than oppositely as in FIG. 1. Speed control unit 63 normally introduces into the system a predetermined differential in speed, so that gears 32a and 37a are turning in the same direction but at different speeds. The control input shaft is driven at a speed or speeds which are always maintained between the speeds of the two gears 32a and 37a. As will be understood, the screw thread connection (60—61 of FIG. 1) acts to automatically respond to relative rotary movement between the control input shaft and the output shaft in a manner shifting clutch part 51a clutching gears 32a, and 37a to the output shaft 16a as necessary to cause the latter to follow substantially exactly the movements of the control input shaft 14a.

Unit 63 is actuable to different conditions as desired to vary the speed differential of gears 32a and 37a. Unit 62 is actuable to a reversing condition to cause gears 32a and 37a to turn in opposite directions, and thus attain an operation similar to that of FIG. 1.

The unit 62 may be any of a multitude of different types of reversing transmission known to the prior art, and unit 63 may be any known type of variable speed transmission. For example, unit 62 could be the transmission shown in U.S. Patent Number 2,299,563, issued to Carlson et al. in which case the input shaft 2 of the patent would be driven by the shaft designated 44' in the present FIG. 3; and the output shaft 3 of the patent would drive shaft 44'' of FIG. 3. Similarly, speed regulating mechanism 63 could be the transmission shown in U.S. Patent Number 2,487,735, issued to Sherman et al., in which case the input shaft 39 of the patent would be driven by applicant's shaft 44'', and shaft 14 of the patent would drive shaft 44''' of applicant's FIG. 3. Further, virtually any other type of transmission conventionally used in automobiles could be employed as either unit 62 or 63, or as both units combined, since practically all automobile transmissions act to both reverse the direction of rotation of the output shaft and vary its speed.

The transmissions 62 and 63 may be controlled in any suitable manner, as by control levers typically represented at 62' and 63'.

I claim:

1. A mechanical power amplifier comprising a control input shaft, an output shaft, first and second means rotatable about a common axis, said first means including a unit connected to said output shaft to drive it rotatively, said second means including two rotary elements to be simultaneously power driven at different angular velocites about said axis, means for connecting said elements to power source means in a relation to drive said elements simultaneously at said different angular velocities, one of said first and second means being free for axial movement relative to the other between first and second positions, clutch means operable to drive said unit from a first of said elements in one of said positions of said one means, and to drive said unit from a second of said elements in the second position of said one means, and automatic shifting means operable to shift said one means axially between said two positions in response to rotary movement of the control input shaft relative to said output shaft.

2. A mechanical power amplifier as recited in claim 1, in which said two rotary elements are power driven in opposite rotary directions.

3. A mechanical power amplifier as recited in claim 1, in which said two rotary elements are power driven at different speeds in the same rotary direction.

4. A mechanical power amplifier as recited in claim 1, including means for controllably varying the difference in angular velocity between said two elements.

5. A mechanical power amplifier comprising a control input shaft, an output shaft, a unit mounted to turn about an axis and connected to said output shaft to drive it rotatively, two rotary elements to be simultaneously power driven at different angular velocities about said axis, means for connecting said elements to power source means in a relation to drive said elements simultaneously at said different angular velocities, said unit being free for axial movement relative to said two elements between first and second positions, clutch means operable to drive said unit from a first of said elements at a first of said angular velocities in one of said positions of said unit, and to drive said unit from a second of said elements at the second angular velocity in the second position of said unit, and a connection between said control input shaft and said unit operable to shift said unit axially between said two positions in response to rotary movement of the control input shaft relative to said unit.

6. A mechanical power amplifier as recited in claim 5, in which said two rotary elements are power driven in opposite rotary directions.

7. A mechanical power amplifier as recited in claim 5, including a connection keying said output shaft to said unit to be driven rotatively thereby but allowing axial movement of said unit relative to the output shaft.

8. A mechanical power amplifier comprising a control input shaft, an output shaft, a first unit rotatable about a predetermined axis and connected to said output shaft in driving relation, two rotary elements mounted for rotation about said axis at opposite axial sides of said unit, power energized motor means driving said two elements simultaneously at different angular velocities, said unit being free for axial movement relative to said two elements between first and second positions, clutch means operable to drive said unit from a first of the elements at a first of said angular velocities in one of said positions of said unit, and to drive said unit from a second of said elements at the second angular velocity in the second position of said unit, and a screw thread connection between said control input shaft and said unit operable to shift said unit axially between said two positions in response to rotary movement of the control input shaft relative to said unit.

9. A mechanical power amplifier as recited in claim 8, including a connection keying said output shaft to said unit to be driven rotatively thereby but allowing axial movement of said unit relative to the output shaft.

10. A mechanical power amplifier as recited in claim 9, in which said clutch means include friction surfaces on said two elements directed axially toward said unit therebetween, and friction surfaces on said unit facing in opposite axial directions and engageable with said friction surfaces of said two elements respectively.

11. A mechanical power amplifier as recited in claim 8, in which said unit is essentially annular and disposed about said control input shaft, said connection including internal threads in said unit engageable with external threads on said control input shaft.

12. A mechanical power amplifier as recited in claim 8, in which said output shaft extends axially through one of said elements and has an inner end projecting into a recess in said unit, said control input shaft projecting axially through the other element and axially into said unit.

13. A mechanical power amplifier as recited in claim 8, in which said output shaft extends axially through one of said elements and has an inner end projecting into a recess in said unit, said control input shaft projecting axially through the other element and axially into said unit, said screw thread connection including internal threads formed in said unit and engageable with external threads on said control input shaft.

14. A mechanical power amplifier as recited in claim 13, in which said unit is rotatively keyed to said output shaft but is free for axial shifting movement relative thereto.

15. A mechanical power amplifier comprising a control input shaft, an output shaft, first and second means rotatable about a common axis, said first means including a unit connected to said output shaft to drive it rotatively, said second means including two rotary elements simultaneously power driven at different angular velocities about said axis, one of said means being free for axial movement relative to the other between first and second positions, clutch means operable to drive said unit from a first of said elements in one of said positions of said one means, and to drive said unit from a second of said elements in the second position of said one means, and a screw threaded automatic shifting connection operable to shift said one means axially between said two positions in response to rotary movement of the control input shaft relative to said output shaft.

16. A mechanical power amplifier comprising a control input shaft, an output shaft, a unit mounted to turn about an axis and connected to said output shaft to drive it rotatively, two rotary elements simultaneously power driven at different angular velocities about said axis, said unit being free for axial movement relative to said two elements being first and second positions, clutch means operable to drive said unit from a first of said elements at a first of said angular velocities in one of said positions of said unit, and to drive said unit from a second of said elements at the second angular velocity in the second position of said unit, and a screw threaded connection between said input shaft and said unit operable to shift said unit axially between said two positions in response to rotary movement of the control input shaft relative to said unit.

References Cited in the file of this patent

UNITED STATES PATENTS

| | | |
|---|---|---|
| 982,868 | Press | Jan. 31, 1911 |
| 1,796,232 | Barnes | Mar. 10, 1931 |
| 2,939,329 | Doerries | June 7, 1960 |
| 2,975,648 | Doerries | Mar. 21, 1961 |
| 3,008,558 | Bennett et al. | Nov. 14, 1961 |